US009351092B2

(12) United States Patent
Muramatsu et al.

(10) Patent No.: US 9,351,092 B2
(45) Date of Patent: May 24, 2016

(54) AUDIO PROCESSING DEVICE, AUDIO PROCESSING METHOD, AND PROGRAM

(75) Inventors: Tomoaki Muramatsu, Chiba (JP); Nobuhiko Nakamura, Kanagawa (JP); Yoshio Oguchi, Chiba (JP); Masanobu Sayama, Chiba (JP)

(73) Assignee: SONY CORPORATION, Tokyo (JP)

( * ) Notice: Subject to any disclaimer, the term of this patent is extended or adjusted under 35 U.S.C. 154(b) by 570 days.

(21) Appl. No.: 13/161,604

(22) Filed: Jun. 16, 2011

(65) Prior Publication Data

US 2012/0002828 A1 Jan. 5, 2012

(30) Foreign Application Priority Data

Jun. 30, 2010 (JP) ................................ 2010-149365

(51) Int. Cl.
*H04R 5/02* (2006.01)
*H04R 1/02* (2006.01)
*H04S 3/00* (2006.01)
*H04N 5/64* (2006.01)
*H04N 13/04* (2006.01)

(52) U.S. Cl.
CPC ............... *H04S 3/008* (2013.01); *H04N 5/642* (2013.01); *H04N 13/04* (2013.01); *H04N 13/0438* (2013.01); *H04R 2499/15* (2013.01); *H04S 2400/11* (2013.01)

(58) Field of Classification Search
CPC .......... H04N 13/0484; H04N 13/0472; H04N 5/642; H04R 5/02; H04R 2499/15; H04S 1/002

USPC .......... 381/303, 285, 306, 333, 388; 382/285, 382/194
See application file for complete search history.

(56) References Cited

U.S. PATENT DOCUMENTS

| | | | | |
|---|---|---|---|---|
| 4,706,117 A * | 11/1987 | Schoolman | ...................... | 348/53 |
| 5,422,653 A * | 6/1995 | Maguire, Jr. | ...................... | 345/9 |
| 5,714,997 A * | 2/1998 | Anderson | ...................... | 348/39 |
| 5,754,660 A * | 5/1998 | Shimizu | ...................... | 381/17 |
| 5,781,165 A * | 7/1998 | Tabata | ...................... | 345/8 |
| 5,825,340 A * | 10/1998 | Torizuka et al. | ...................... | 345/8 |
| 5,862,229 A * | 1/1999 | Shimizu | ...................... | 381/17 |
| 6,141,034 A * | 10/2000 | McCutchen | ...................... | 348/36 |
| 6,241,609 B1 * | 6/2001 | Rutgers | ...................... | 463/31 |
| 6,307,589 B1 * | 10/2001 | Maquire, Jr. | ............. | 348/333.03 |
| 6,543,899 B2 * | 4/2003 | Covannon et al. | ................. | 353/7 |
| 6,891,527 B1 * | 5/2005 | Chapman et al. | ............. | 345/158 |
| 7,439,940 B1 * | 10/2008 | Maguire, Jr. | ...................... | 345/7 |
| 7,492,915 B2 * | 2/2009 | Jahnke | ...................... | 381/119 |
| 7,563,168 B2 * | 7/2009 | Jahnke | ...................... | 463/35 |
| 7,957,581 B2 * | 6/2011 | Wu | ...................... | 382/154 |

(Continued)

FOREIGN PATENT DOCUMENTS

JP 2004-038933 A 2/2004
JP 2006128816 A * 5/2006

(Continued)

*Primary Examiner* — Xu Mei
(74) *Attorney, Agent, or Firm* — Hazuki International, LLC

(57) ABSTRACT

There is provided an audio processing device including an estimation unit configured to estimate a user's representative perceived position of a stereoscopic image from a difference between a left-eye image and a right-eye image of the stereoscopic image displayed on a display device, and an audio controller configured to control audio output of an audio output device in accordance with the representative perceived position estimated by the estimation unit.

20 Claims, 10 Drawing Sheets

(56) References Cited

U.S. PATENT DOCUMENTS

| | | | | |
|---|---|---|---|---|
| 8,248,462 | B2* | 8/2012 | Peterka et al. | 348/54 |
| 8,269,822 | B2* | 9/2012 | Zalewski | 348/56 |
| 8,436,808 | B2* | 5/2013 | Chapman et al. | 345/156 |
| 8,643,569 | B2* | 2/2014 | Vesely | 345/8 |
| 2002/0186348 | A1* | 12/2002 | Covannon et al. | 351/240 |
| 2003/0198404 | A1* | 10/2003 | Frisken et al. | 382/285 |
| 2005/0110773 | A1* | 5/2005 | Chapman et al. | 345/174 |
| 2005/0122584 | A1* | 6/2005 | Ishikawa et al. | 359/463 |
| 2005/0129325 | A1* | 6/2005 | Wu | 382/254 |
| 2005/0179701 | A1* | 8/2005 | Jahnke | 345/619 |
| 2005/0182608 | A1* | 8/2005 | Jahnke | 703/6 |
| 2005/0219240 | A1* | 10/2005 | Vesely et al. | 345/419 |
| 2005/0219694 | A1* | 10/2005 | Vesely et al. | 359/463 |
| 2005/0219695 | A1* | 10/2005 | Vesely et al. | 359/463 |
| 2005/0264558 | A1* | 12/2005 | Vesely et al. | 345/419 |
| 2005/0264559 | A1* | 12/2005 | Vesely et al. | 345/419 |
| 2005/0264857 | A1* | 12/2005 | Vesely et al. | 359/13 |
| 2005/0264858 | A1* | 12/2005 | Vesely et al. | 359/13 |
| 2005/0275913 | A1* | 12/2005 | Vesely et al. | 359/13 |
| 2005/0275914 | A1* | 12/2005 | Vesely et al. | 359/13 |
| 2005/0281411 | A1* | 12/2005 | Vesely et al. | 381/61 |
| 2008/0143895 | A1* | 6/2008 | Peterka et al. | 349/15 |
| 2009/0066785 | A1* | 3/2009 | Lee | 348/51 |
| 2009/0189974 | A1* | 7/2009 | Deering | 348/46 |
| 2010/0272417 | A1* | 10/2010 | Nagasawa et al. | 386/97 |
| 2010/0275238 | A1* | 10/2010 | Nagasawa et al. | 725/116 |
| 2010/0329640 | A1* | 12/2010 | Okada et al. | 386/252 |

FOREIGN PATENT DOCUMENTS

| | | | |
|---|---|---|---|
| JP | 2006128818 A | * | 5/2006 |
| JP | 2006139827 A | * | 6/2006 |
| JP | 2006140618 A | * | 6/2006 |
| JP | 2006148542 A | * | 6/2006 |
| JP | 2006179174 A | * | 7/2006 |
| JP | 2006191357 A | * | 7/2006 |
| JP | 2006245680 A | * | 9/2006 |
| JP | 2007208318 A | * | 8/2007 |

* cited by examiner

FIG. 1
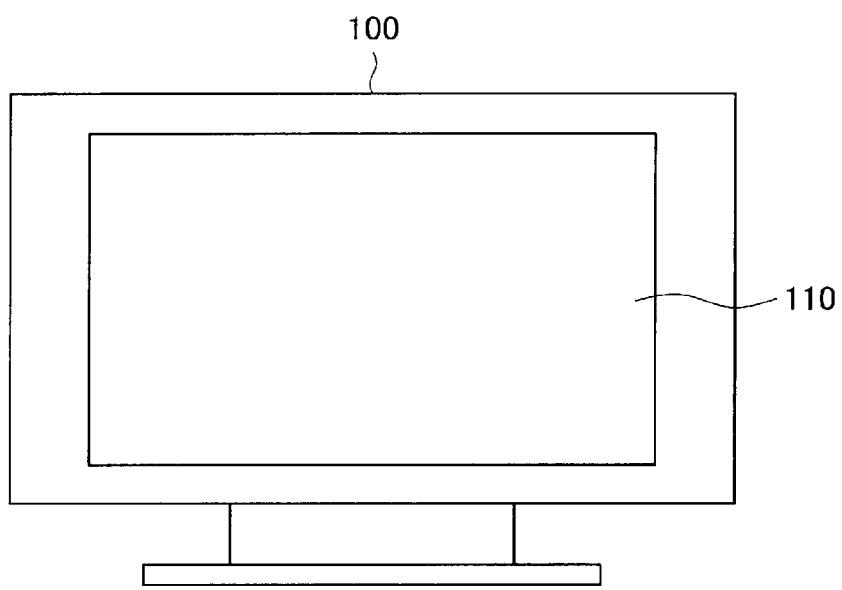
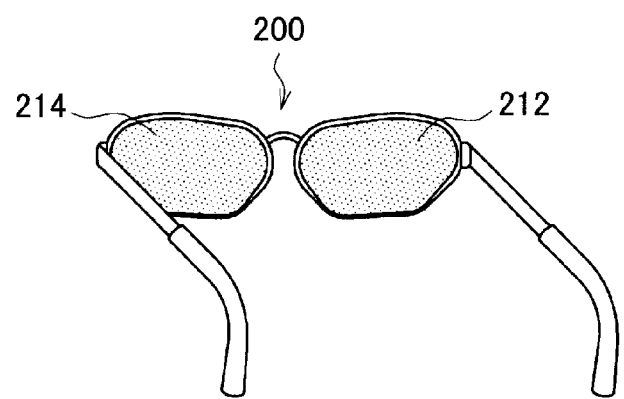

FIG. 6

| area 0 | area 1 | ... | | | |
|---|---|---|---|---|---|
| area 6 | ... | | | | |
| ... | | | | | |
| | | | | | |
| | | | | | |
| | | | | | |
| | | | | | |
| | | | | | |
| | | | | | |
| | | | | | area N |

| x0 | 4cm |
|---|---|
| x1 | 4cm |
| x2 | 40cm |
| x3 | 48cm |
| x4 | 50cm |
| x5 | 30cm |
| x6 | 21cm |
| x7 | 23cm |
| x8 | 20cm |
| x9 | 25cm |

AUDIO PROCESSING DEVICE, AUDIO PROCESSING METHOD, AND PROGRAM

CROSS REFERENCE TO RELATED APPLICATION

This application claims the priority benefit of Japanese Patent Application No. JP 2010-149365, filed Jun. 30, 2010, the entire contents of which is hereby incorporated by reference.

BACKGROUND

The present disclosure relates to an audio processing device, an audio processing method, and a program.

Nowadays, 3D display devices, which are capable of allowing a user to perceive a stereoscopic image by displaying an image for the left eye and an image for the right eye, are circulated. It is expected that the 3D display devices will become more widespread in the future because television contents and movies that are produced for 3D viewing are increasing and also because researches are actively conducted on the technologies for converting a 2D image into a 3D image. JP 2004-38933A is a document that discloses a 3D display device.

Meanwhile, for audio, there exists a multi-channel system like 5.1 ch. With this system, it is possible to provide a user with a realistic sound field by controlling each of a plurality of speakers such as right and left front speakers, right and left rear speakers, and a center speaker to output audio that has been generated for the individual speaker.

SUMMARY

However, when a 2D image is converted into a 3D image, it is concerned that the linkage between audio for the 2D image and the 3D image after the conversion may be impaired. Further, although audio for a 3D image is typically produced by taking a 3D image into consideration, it has been difficult with the conventional 3D display devices to more emphasize the linkage between a 3D image and audio for the 3D image.

In light of the foregoing, it is desirable to provide a novel and improved audio processing device, audio processing method, and program that are capable of more emphasizing the linkage between a stereoscopic image and audio.

According to an embodiment of the present disclosure, there is provided an audio processing device including an estimation unit configured to estimate a user's representative perceived position of a stereoscopic image from a difference between a left-eye image and a right-eye image of the stereoscopic image displayed on a display device, and an audio controller configured to control audio output of an audio output device in accordance with the representative perceived position estimated by the estimation unit.

The audio output device may include a front audio output device and a rear audio output device, the rear audio output device being arranged at a position that is farther from the display device than is the front audio output device, and the audio controller may control audio output of the front audio output device and the rear audio output device in accordance with a distance between the representative perceived position and a reference plane.

The audio controller may, when the representative perceived position coincides with the reference plane, supply a first audio signal to the front audio output device, and supply a second audio signal to the rear audio output device.

The audio controller may, when the representative perceived position is closer to the user than is the reference plane, supply the first audio signal to the front audio output device and the rear audio output device at a ratio in accordance with a distance between the representative perceived position and the reference plane.

The audio controller may, as the distance between the representative perceived position and the reference plane is longer, supply the first audio signal to the rear audio output device at a higher rate.

The audio controller may, as the distance between the representative perceived position and the reference plane is longer, reduce the second audio signal supplied to the rear audio output device.

The audio controller may, when the reference plane is closer to the user than is the representative perceived position, supply the second audio signal to the front audio output device and the rear audio output device at a ratio in accordance with the distance between the representative perceived position and the reference plane.

The audio controller may, as the distance between the representative perceived position and the reference plane is longer, supply the second audio signal to the front audio output device at a higher rate.

The audio controller may, as the distance between the representative perceived position and the reference plane is longer, reduce the first audio signal supplied to the front audio output device.

The estimation unit may estimate a user's perceived position(s) of one or more image objects included in the left-eye image and the right-eye image, and estimate the representative perceived position on the basis of the perceived position(s) of the one or more image objects.

The estimation unit may estimate as the representative perceived position one of the perceived positions of the image objects.

The estimation unit may estimate as the representative perceived position a mean value of the perceived positions of the image objects.

The estimation unit may estimate user's perceived positions of a plurality of regions that are obtained by dividing the left-eye image and the right-eye image, and estimate the representative perceived position on the basis of a distribution of the perceived positions of the plurality of regions.

According to another embodiment of the present disclosure, there is provided an audio processing method including estimating a user's representative perceived position of a stereoscopic image from a difference between a left-eye image and a right-eye image of the stereoscopic image displayed on a display device, and controlling audio output of an audio output device in accordance with the representative perceived position.

According to still another embodiment of the present disclosure, there is provided a program for causing a computer to function as an estimation unit configured to estimate a user's representative perceived position of a stereoscopic image from a difference between a left-eye image and a right-eye image of the stereoscopic image displayed on a display device, and an audio controller configured to control audio output of an audio output device in accordance with the representative perceived position estimated by the estimation unit.

According to the embodiments of the present disclosure described above, the linkage between a stereoscopic image and audio can be emphasized more.

BRIEF DESCRIPTION OF THE DRAWINGS

FIG. 1 is an explanatory diagram showing the appearance of a display device in accordance with an embodiment of the present disclosure;

FIG. 6 is an explanatory diagram showing an example of image division;

FIG. 7 is an explanatory diagram showing a specific example of the distance xm of each area;

DETAILED DESCRIPTION OF THE EMBODIMENTS

Figure 2:
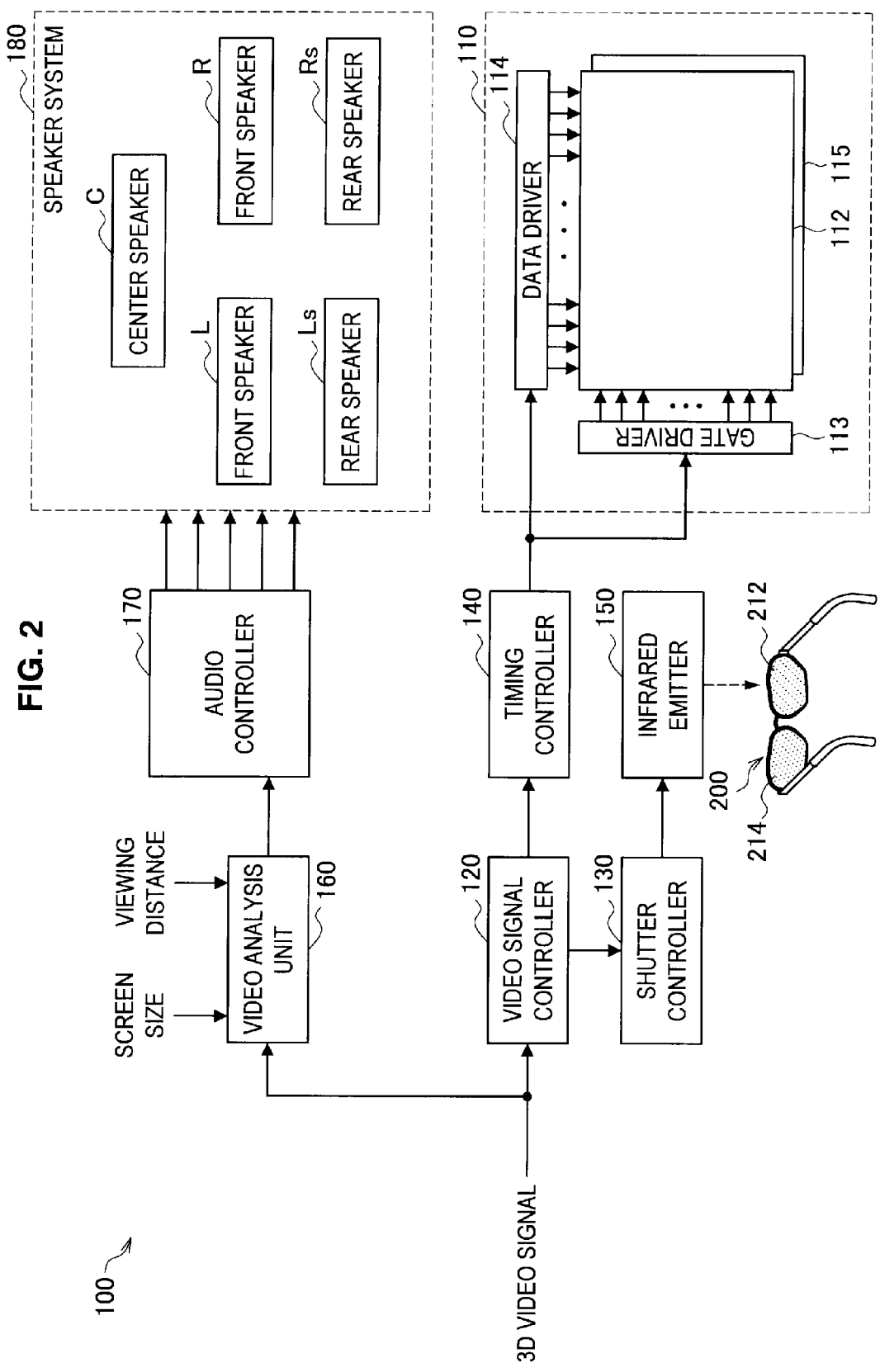
FIG. 2 is a functional block diagram showing the configuration of a display device in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

1. Overview of Display Device in Accordance With Embodiment of the Present Disclosure First, an overview of a display device 100 in accordance with an embodiment of the present disclosure will be described with reference to FIG. 1.

FIG. 1 is an explanatory diagram showing the appearance of the display device 100 in accordance with an embodiment of the present disclosure. Note that in FIG. 1, shutter eyeglasses 200 worn by a user are shown in conjunction with the display device 100.

As shown in FIG. 1, the display device 100 has an image display unit 111 for displaying images. The display device 100 is capable of allowing a user to perceive a stereoscopic image by displaying an image for the left eye (hereinafter referred to as a left-eye image) and an image for the right eye (hereinafter referred to as a right-eye image) on the image display unit 110. In addition, this display device 100 also has a function of an audio processing device for controlling audio output of each speaker, which constitutes a speaker system, as detailed in the "2. Configuration of Display Device" section.

The shutter eyeglasses 200 include a right-eye-image transmitting portion 212 and a left-eye-image transmitting portion 214 that are formed of liquid crystal shutters, for example. The shutter eyeglasses 200 execute an operation of opening or closing the right-eye-image transmitting portion 212 and the left-eye-image transmitting portion 214 in response to a signal transmitted from the display device 100. A user can perceive a left-eye image and a right-eye image, which are displayed on the image display unit 110, as a stereoscopic image by viewing light emitted from the image display unit 111 through the right-eye-image transmitting portion 212 and the left-eye-image transmitting portion 214 of the shutter eyeglasses 200.

Meanwhile, when a common 2D image is displayed on the image display unit 110, a user can perceive an image displayed on the image display unit 110 as a common 2D image by viewing light emitted from the image display unit 110 as it is.

Although the display device 100 is shown as an exemplary audio processing device in FIG. 1, the audio processing device of the present disclosure is not limited thereto. For example, the audio processing device can be an information processing device such as a PC (Personal Computer), a home video processing device (e.g., a DVD recorder or a videocassette recorder), a PDA (Personal Digital Assistant), a home game machine, a portable phone, a portable video processing device, or a portable game machine.

In addition, although this specification describes a control scheme that utilizes a shutter operation to allow a left-eye image and a right-eye image to be perceived by the left eye and the right eye, respectively, the control scheme of the present disclosure is not limited thereto. For example, an equivalent effect can be obtained by using a polarizing filter for the left eye and a polarizing filter for the right eye.

2. Configuration of Display Device

Described above is the overview of the display device 100 in accordance with an embodiment of the present disclosure. Next, the configuration of the display device 100 in accordance with an embodiment of the present disclosure will be described with reference to FIG. 2.

FIG. 2 is a functional block diagram showing the configuration of the display device 100 in accordance with an embodiment of the present disclosure. As shown in FIG. 2, the display device 100 includes an image display unit 110, a video signal controller 120, a shutter controller 130, a timing controller 140, an infrared emitter 150, a video analysis unit 160, an audio controller 170, and a speaker system 180.

The image display unit 110 has a configuration for displaying an image as described above, and when an external signal is applied thereto, displays an image corresponding to the applied signal. The image display unit 110 includes, as shown in FIG. 2, a display panel 112, a gate driver 113, a data driver 114, and a backlight 115.

The display panel 112 is configured to display an image in response to an external signal applied thereto. The display panel 112 displays an image as a plurality of scan lines are sequentially scanned. The display panel 112 has a pair of transparent plates made of glass or the like, and liquid crystal molecules, which have a predetermined orientation state, placed between the transparent plates. The method of driving the display panel 112 can be a TN (Twisted Nematic) scheme, a VA (Vertical Alignment) scheme, or an IPS (In-Plane-Switching) scheme. The display panel 112 in accordance with the embodiment of the present disclosure alternately displays right-eye images and left-eye images at predetermined timings in response to external signals applied thereto.

The gate driver 113 is a driver for driving gate bus lines (not shown) of the display panel 112. The gate driver 113 receives signals transmitted from the timing controller 140, and outputs signals to the gate bus lines in response to the signals transmitted from the timing controller 140.

The data driver 114 is a driver for generating signals to be applied to data lines (not shown) of the display panel 112. The data driver 114 receives signals transmitted from the timing controller 140, and generates signals to be applied to the data lines in response to the signals transmitted from the timing controller 140, and then outputs the signals.

The backlight 115 is provided on the deepest portion of the image display unit 110 seen from a user. When an image is displayed on the image display unit 110, white light, which has not been polarized (unpolarized light), is emitted from the backlight 115 to the display panel 112 located on the user side. For the backlight 115, either light-emitting diodes or a cold-cathode tube can be used. Although FIG. 2 shows a surface light source as the backlight 115, the configuration of the light source of the present disclosure is not limited to such example. For example, it is possible to inject light to the display panel 112 by arranging a light source on the peripheral portion of the display panel 112 and diffusing light from the light source using a diffuser plate or the like. Alternatively, instead of using a surface light source, it is also possible to use a point light source and a condenser lens in combination, for example.

The video signal controller 120, upon receiving a 3D video signal for displaying a left-eye image and a right-eye image, generates a video signal for alternately displaying the left-eye image and the right-eye image on the image display unit 110. The video signal generated by the video signal controller 120 is transmitted to the timing controller 140.

The shutter controller 130, upon receiving a predetermined signal generated in accordance with the signal processing of the video signal controller 120, generates a shutter control signal for controlling the shutter operation of the shutter eyeglasses 200 in response to the signal. The shutter eyeglasses 200 execute an operation of opening or closing the right-eye-image transmitting portion 212 and the left-eye-image transmitting portion 214 on the basis of the shutter control signal that has been generated by the shutter controller 130 and emitted from the infrared emitter 150. Specifically, the shutter operation is executed in such a manner that while a left-eye image is displayed on the display panel 112, the left-eye-image transmitting portion 214 is open, and while a right-eye image is displayed on the display panel 112, the right-eye-image transmitting portion 212 is open.

The timing controller 140, in response to the signal transmitted from the video signal controller 120, generates pulse signals used to operate the gate driver 113 and the data driver 114. As the timing controller 140 generates pulse signals and the gate driver 113 and the data driver 114 receive the pulse signals generated by the timing controller 140, an image corresponding to the video signal transmitted from the video signal controller 120 is displayed on the display panel 112.

The video analysis unit 160 functions as an estimation unit for estimating a user's representative perceived position of a stereoscopic image that is based on the 3D video signal. For the estimation, information such as the 3D video signal, a screen size of the image display unit 110, and the viewing distance between the user and the image display unit 110 is supplied to the video analysis unit 160. Information such as the screen size of the image display unit 110 and the viewing distance between the user and the image display unit 110 can be either set on the display device 100, or be entered via an operation by the user. The method of estimating the representative perceived position will be detailed in the "2-1. Estimation of Representative Perceived Position" section.

The audio controller 170 controls audio output of the speaker system (audio output device) 180 in accordance with the representative perceived position estimated by the video analysis unit 160. Specifically, the speaker system 180 includes a center speaker C, a front speaker (a front audio output device) L, a front speaker (a front audio output device) R, a rear speaker (rear audio output device) Ls, and a rear speaker (a rear audio output device) Rs, and the audio controller 170 controls audio output of each speaker. The audio control performed by the audio controller 170 will be detailed in the "2-2. Specific Examples of Audio Control" section.

Described above is the configuration of the display device 100 in accordance with an embodiment of the present disclosure. Hereinafter, estimation of the representative perceived position by the video analysis unit 160 and audio control performed by the audio controller 170 will be described in more detail.

2-1. Estimation of Representative Perceived Position

First Example

For estimation of the representative perceived position, the size of a single pixel of the image display unit 110 is used. Thus, if the size of a single pixel is unknown, the video analysis unit 160 calculates the size (pixel_cm) from information on the screen size of the image display unit 110.

For example, consider a case in which the following values are known as the information on the screen size.

TV_INCH: the size of the image display unit 110 [inch]
TV_WIDTH_PIXEL: the number of pixels in the effective screen (horizontal) [pixel]
TV_HEIGHT_PIXEL: the number of pixels in the effective screen (vertical) [pixel]

Figure 3:
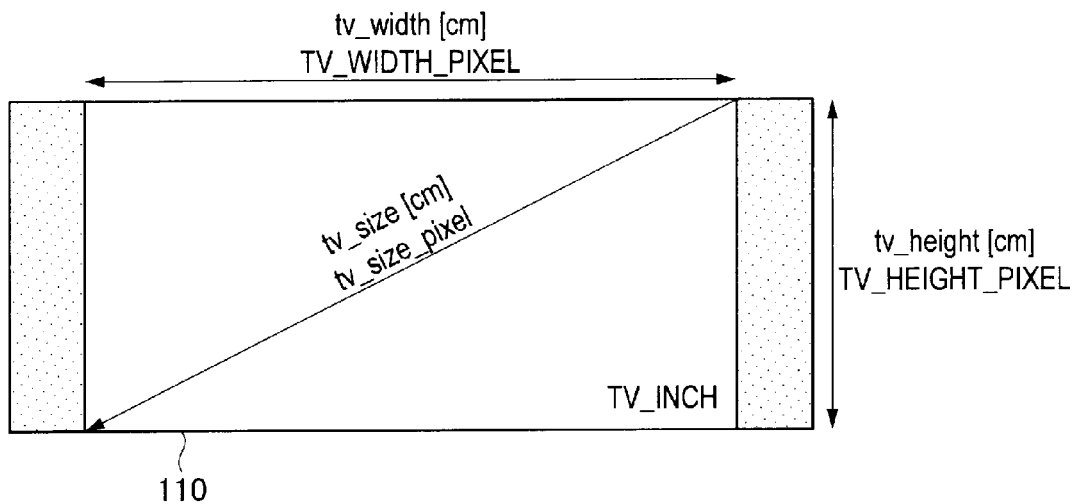
FIG. 3 is a diagram illustrating the size lettering of an image display unit.

In this case, the following values shown in FIG. 3 can be calculated from the information on the screen size.

tv_size_pixel: the size of the effective screen [pixel]
tv_size: the size of the effective screen [cm]
tv_width: the width of the effective screen [cm]
tv_height: the height of the effective screen [cm]

For example, tv_size_pixel and tv_size are calculated in accordance with the following formula.

$$\text{tv\_size\_pixel} = \text{sqrt}(\text{TV\_WIDTH\_PIXEL}^2 + \text{TV\_HEIGHT\_PIXEL}^2)$$

$$\text{tv\_size} = \text{TV\_INCH} \times 2.54$$

Further, pixel_cm that is the size of a single pixel is calculated from tv_size_pixel and tv_size in accordance with the following formula.

pixel_cm=tv_size/tv_size_pixel

Specifically, when TV_INCH is 40 inches, TV_WIDTH_PIXEL is 1920 pixels, and TV_HEIGHT_PIXEL is 1080 pixels, each value is calculated as follows.

tv_size_pixel=2202.9 pixels tv_size=101.6 cm pixel_cm=0.0461 cm

The video analysis unit 160, on the basis of the aforementioned pixel_cm and the difference between the left-eye image and the right-eye image, estimates the user's representative perceived position of the stereoscopic image. That is, the video analysis unit 160 calculates the distance x between the user's representative perceived position of the stereoscopic image and the image display unit 110. Herein, the representative perceived position can be a position at which a representative image object (portion) in the stereoscopic image is to be viewed by the user. Hereinafter, detection of such image object will be briefly described with reference to FIG. 4, and then, a method of calculating the distance x will be described with reference to FIG. 5.

Figure 4:
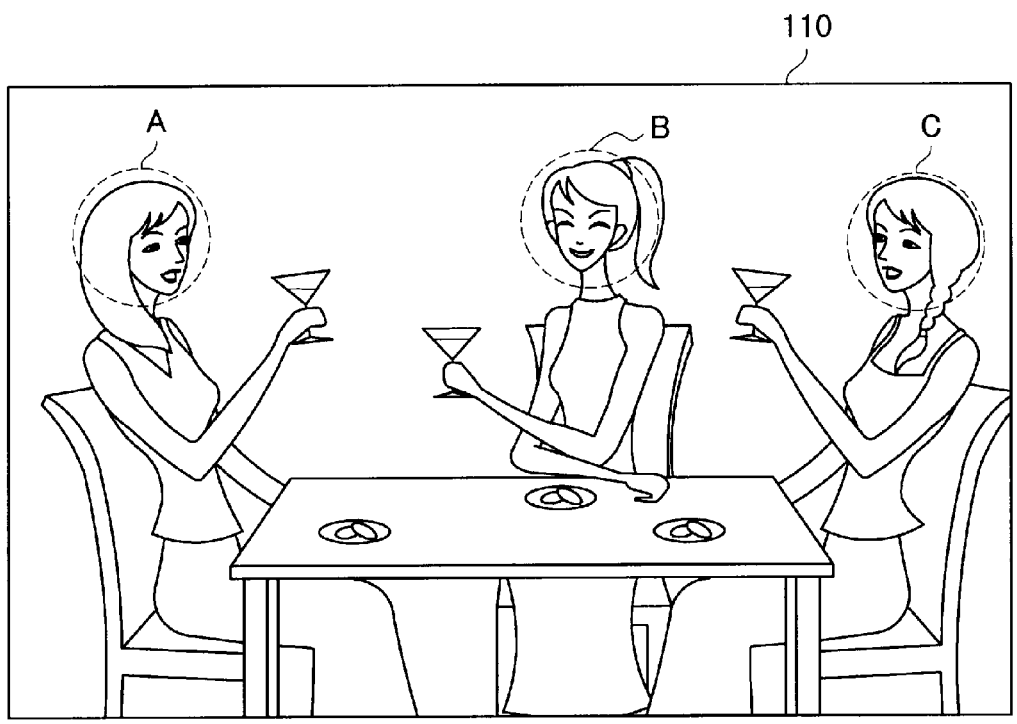
FIG. 4 is an explanatory diagram showing exemplary detection of an image object.

The video analysis unit 160 detects a face image, which is included in a left-eye image and a right-eye image, as an image object using a face detection technology. Consequently, when only a single face image has been detected, the video analysis unit 160 handles the user's perceived position of the face image as the representative perceived position, and calculates the distance x for the face image with a method described below. Meanwhile, when a plurality of face images A to C have been detected as shown in FIG. 4, the video analysis unit 160 can select one of the face images and calculate the distance x for the selected face image. Alternatively, the video analysis unit 160 can calculate the distances x(A) to x(C) for the respective face images A to C, and calculate the mean value of the distances x(A) to x(C) as the distance x.

Figure 5:
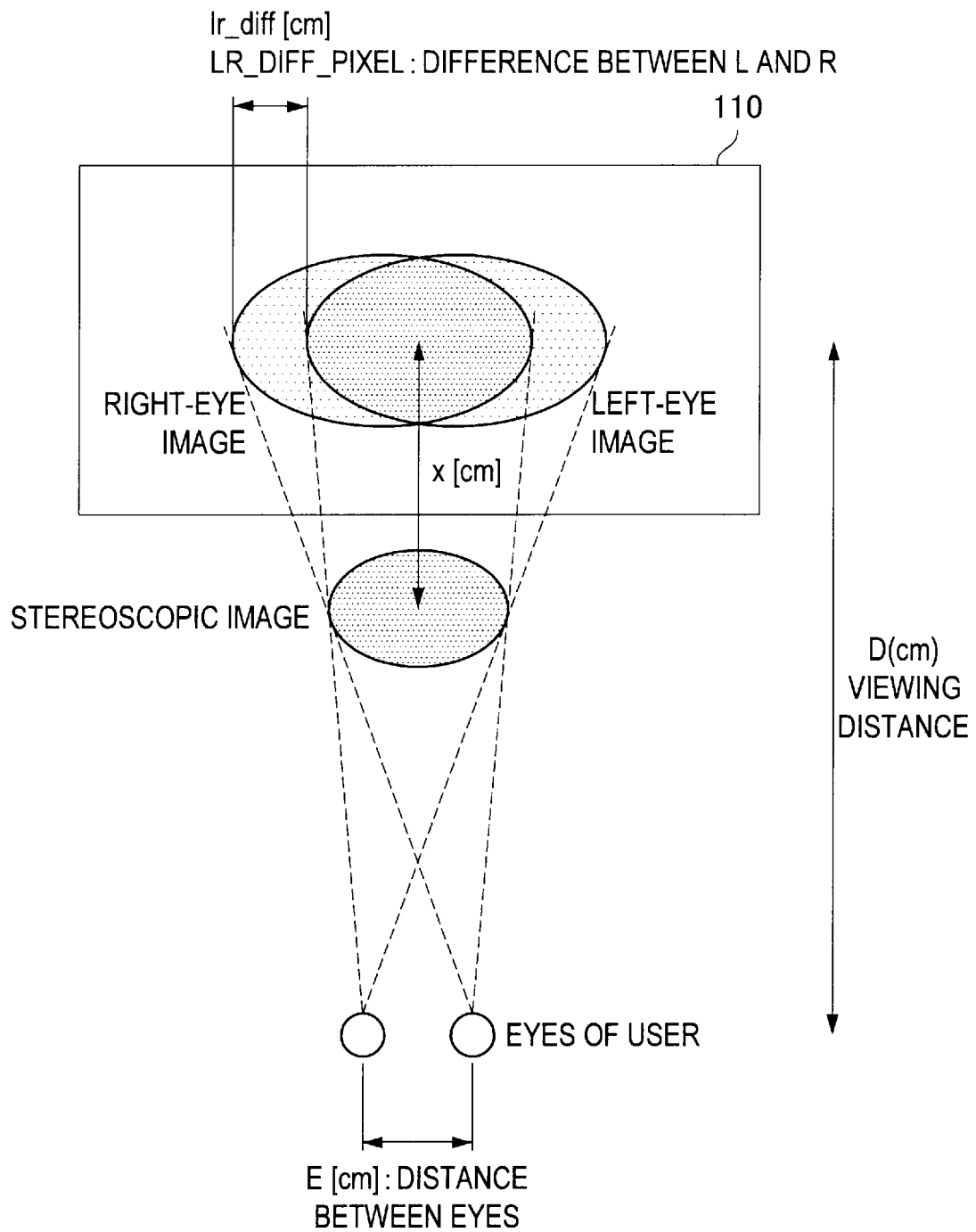
FIG. 5 is an explanatory diagram showing the relationship between the position at which image objects, which are included in a left-eye image and a right-eye image, are displayed and the position at which a stereoscopic image is perceived.

FIG. 5 is an explanatory diagram showing the relationship between the position at which image objects, which are included in a left-eye image and a right-eye image, are displayed and the position at which a stereoscopic image is perceived. As shown in FIG. 5, the video analysis unit 160 converts LR_DIFF_PIXEL (pixel), which is the difference in the horizontal display position between an image object included in the left-eye image and an image object included in the right-eye image, into the value of a cm unit using the aforementioned pixel_cm (see the formula below).

lr_diff=LR_DIFF_PIXEL×pixel_cm

Herein, if the distance D (cm) between the image display unit 110 and the user and the distance E (cm) between the eyes of the user are known, the video analysis unit 160 can calculate the distance x (cm) from the image display unit 110 to the user's perceived position of the image object in accordance with the following formula.

x=lr_diff×D/(E+lr_diff)

As a specific example, when LR_DIFF_PIXEL is 10 pixels, pixel_cm is 0.0461 cm, the distance D is 250 cm, and the distance E is 6 cm, the values of lr_diff and the distance x are as follows. Note that if the user's perceived position of the image object is located on the rear side of the image display unit 110, the distance x has a negative value.

lr_diff=0.4612 cm x=17.845 cm

Second Example

Although the first example has illustrated an example in which the representative perceived position is the user's perceived position of a representative image object (portion) in a stereoscopic image, the representative perceived position of the present disclosure is not limited thereto. For example, as described below, the representative perceived position can be a position that is considered to be dominant among the user's perceived positions of regions that make up a stereoscopic image.

In order to estimate such a representative perceived position, in the second example, a plurality of regions are defined by dividing a left-eye image and a right-eye image, and the distance between the user's perceived position of each region and the image display unit 110 is estimated, so that the distance x is calculated on the basis of the distribution of the distances estimated for the respective regions. Detailed description will be given below with reference to FIGS. 6 and 7.

FIG. 6 is an explanatory diagram showing an example of image division. As shown in FIG. 6, the video analysis unit 160 defines areas 0 to N for a left-eye image and a right-eye image. The shape and the size of each area are not particularly limited, and each area can include, for example, 10×10 pixels.

Then, the video analysis unit 160 calculates, for each area, the distance xm (0≤m≤N) between the user's perceived position of the image in the area and the image display unit 110, in accordance with the method described in the first example. For example, when the number of the areas is 10, the video analysis unit 160 calculates the distances x0 to x9 for the respective areas 0 to 9 as shown in FIG. 7.

Further, the video analysis unit 160 identifies the distance x on the basis of the distribution of the distances xm calculated for the respective areas. For example, the video analysis unit 160 can handle as the distance x the most frequent value among the distances xm calculated for the respective areas. According to such a method, 4 cm, which is the most frequent value among the distances x0 to x9 calculated for the respective areas, is handled as the distance x in the example shown in FIG. 7.

Alternatively, the video analysis unit 160 can calculate, for every predetermined value range, the number of the distances xm included in the value range, and identify the distance x on the basis of the value range that includes the maximum number of the distances xm. For example, when the number of the distances xm (areas) corresponding to the value range of every five cm (e.g., 0 to 5 cm, 5 to 10 cm . . . ) is calculated, the number of the distances xm included in the value range of 20 to 25 cm is the maximum in the example shown in FIG. 7. In such a case, 20 cm, which is the minimum value of the value range can be handled as the distance x, or the mean value of the distances xm included in the value range can be handled as the distance x.

2-2. Specific Examples of Audio Control

The audio controller 170 controls audio output of the speaker system 180 on the basis of the distance x obtained by the video analysis unit 160 as described above. Audio output control performed by the audio controller 170 will be described specifically with reference to FIGS. 8 to 13.

(When x=0)

When the distance x obtained by the video analysis unit 160 is "0," that is, when the user's perceived position P of a stereoscopic image coincides with the position at which the image display unit 110 is arranged (which is an exemplary reference plane), the audio controller 170 controls an audio signal for each speaker to be output from the corresponding speaker as it is.

Figure 8:
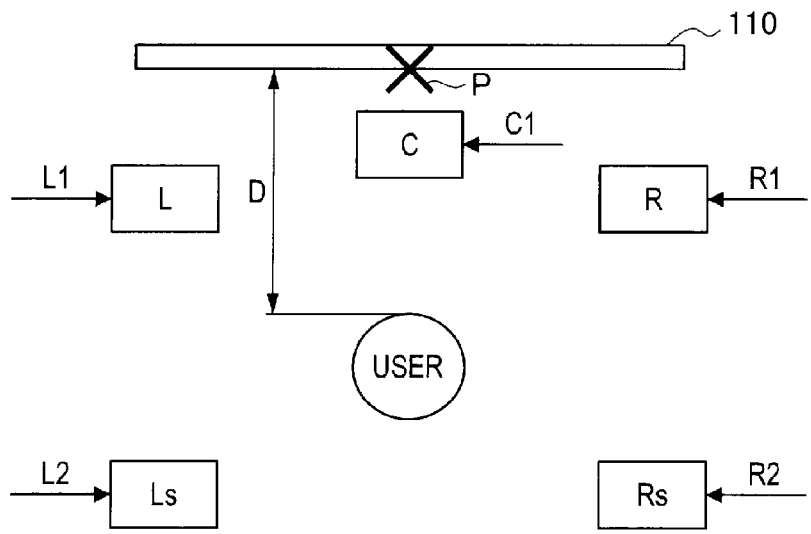
FIG. 8 is an explanatory diagram showing audio control performed by an audio controller when the user's perceived position P of a stereoscopic image coincides with the image display unit.

Specifically, as shown in FIG. 8, the audio controller 170 supplies an audio signal C1 for the center speaker C to the center speaker C, supplies an audio signal L1 for the front speaker L to the front speaker L, and supplies an audio signal R1 for the front speaker R to the front speaker R. Likewise, the audio controller 170 supplies an audio signal L2 for the rear speaker Ls to the rear speaker Ls, and supplies an audio signal R2 for the rear speaker Rs to the rear speaker Rs.

(When x>0)

Figure 9:
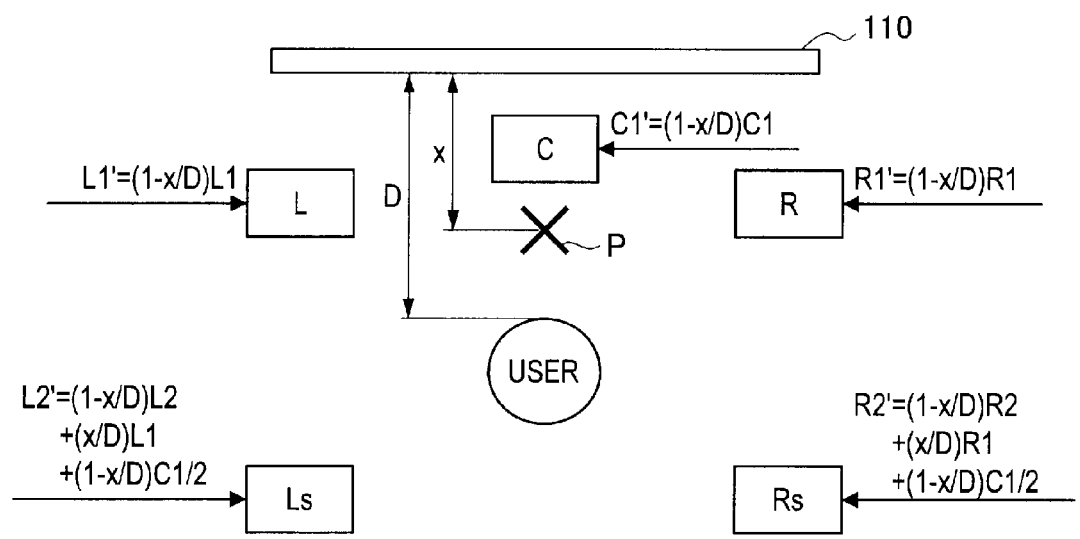
FIG. 9 is an explanatory diagram showing audio control performed by the audio controller when the user's perceived position P of a stereoscopic image is closer to the user than is the image display unit.

Described next with reference to FIG. 9 is audio control performed the audio controller 170 when the distance x obtained by the video analysis unit 160 is greater than "0," that is, when the user's perceived position P of a stereoscopic image is closer to the user than is the image display unit 110.

FIG. 9 is an explanatory diagram illustrating audio control performed by the audio controller 170 when the user's perceived position P of a stereoscopic image is closer to the user than is the image display unit 110. In this case, the audio controller 170 supplies the audio signal L1, which is originally intended for the front speaker L, to the front speaker L and the rear speaker Ls at a volume ratio in accordance with the distance x. More specifically, as the distance x is longer, the audio controller 170 supplies the audio signal L1 to the rear speaker Ls at a higher rate.

Likewise, the audio controller 170 supplies the audio signal R1, which is originally intended for the front speaker R, to the front speaker R and the rear speaker Rs at a volume ratio in accordance with the distance x. More specifically, as the distance x is longer, the audio controller 170 supplies the audio signal R1 to the rear speaker Rs at a higher rate.

In addition, as the distance x is longer, the audio controller 170 reduces the audio signal L2 that is originally intended for the rear speaker Ls and is actually supplied to the rear speaker Ls, and also reduces the audio signal R2 that is originally intended for rear speaker Rs and is actually supplied to the rear speaker Rs.

For example, the audio controller 170 can supply C1', L1', R1', L2', and R2', which are represented by the following formulae, to the center speaker C, the front speaker L, the front speaker R, the rear speaker Ls, and the rear speaker Rs, respectively. Note that C1, L1, R1, L2, and R2 in the following formulae are the audio signals that are originally intended for the corresponding speakers.

$$C1'=(1-x/D)C1$$

$$L1'=(1-x/D)L1$$

$$R1'=(1-x/D)R1$$

$$L2'=(1-x/D)L2+(x/D)L1+(1-x/D)C\tfrac{1}{2}$$

$$R2'=(1-x/D)R2+(x/D)R1+(1-x/D)C\tfrac{1}{2}$$

(When x=D)

Figure 10:
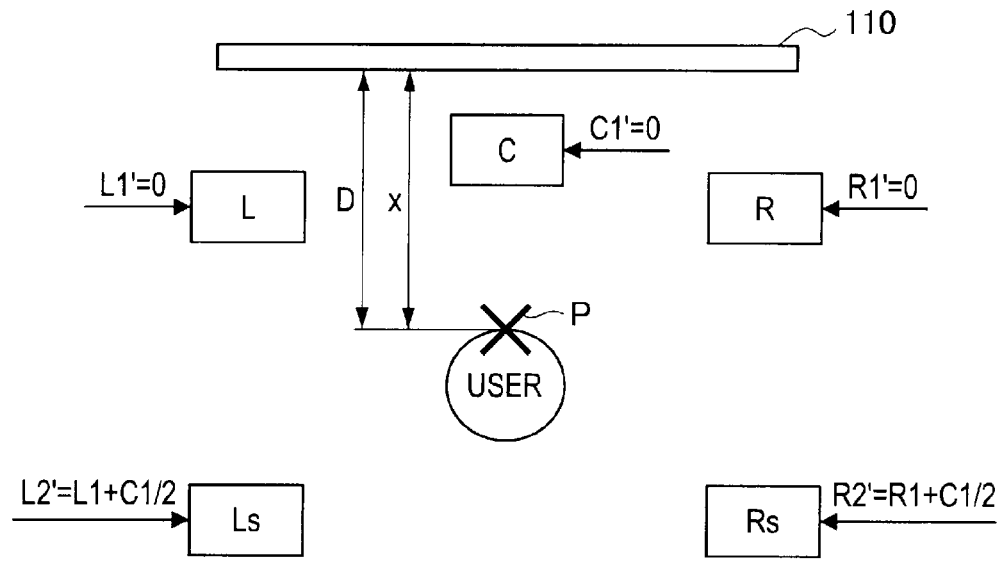
FIG. 10 is an explanatory diagram showing audio control performed by the audio controller when the user's perceived position P of a stereoscopic image is closer to the user than is the image display unit.

When the distance x obtained by the video analysis unit 160 is equal to the viewing distance D of the user as shown in FIG. 10, the audio controller 170 supplies C1', L1', R1', L2', and R2' represented by the following formulae to the corresponding speakers.

$$C1'=0$$

$$L1'=0$$

$$R1'=0$$

$$L2'=L1+C\tfrac{1}{2}$$

$$R2'=R1+C\tfrac{1}{2}$$

(When −D<x<0)

Described next is audio control performed when the distance x obtained by the video analysis unit 160 satisfies "−D<x<0," that is, when the image display unit 110 is closer to the user than is the user's perceived position P of a stereoscopic image, and the absolute value of x is less than D.

Figure 11:
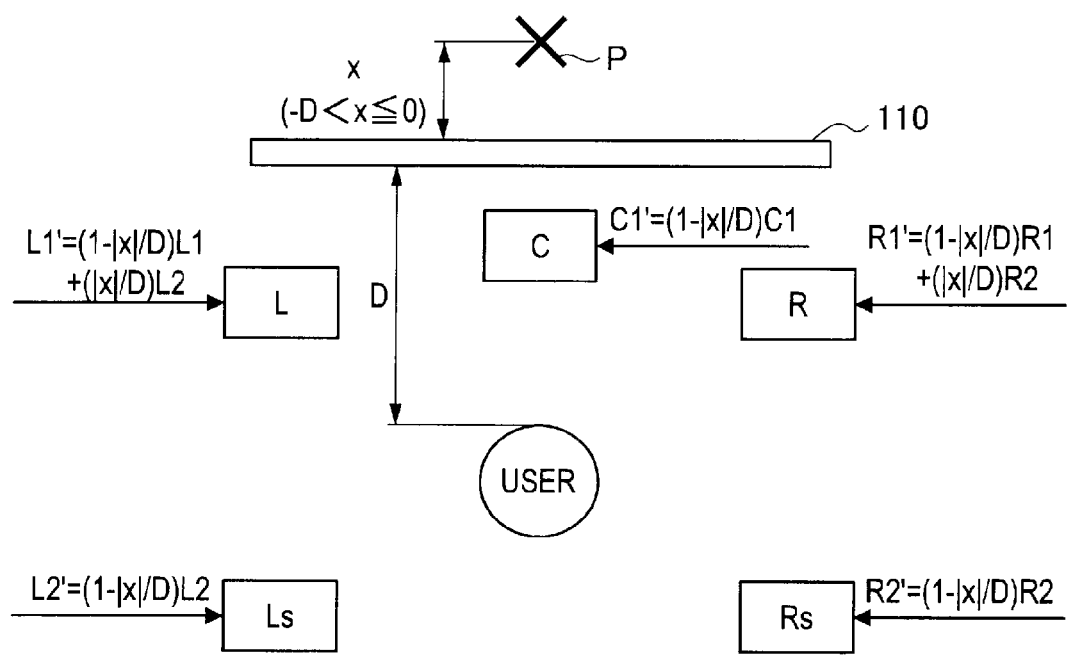
FIG. 11 is an explanatory diagram showing audio control performed by the audio controller when the image display unit is closer to the user than is the user's perceived position P of a stereoscopic image.

FIG. 11 is an explanatory diagram showing audio control performed by the audio controller 170 when the image display unit 110 is closer to the user than is the user's perceived position P of a stereoscopic image. In this case, the audio controller 170 supplies the audio signal L2, which is originally intended for the rear speaker Ls, to the front speaker L and the rear speaker Ls at a volume ratio in accordance with the distance x. More specifically, as the absolute value of the distance x is greater, the audio controller 170 supplies the audio signal L2 to the front speaker L at a higher rate.

Likewise, the audio controller 170 supplies the audio signal R2, which is originally intended for the rear speaker Rs, to the front speaker R and the rear speaker Rs at a volume ratio in accordance with the distance x. More specifically, as the absolute value of the distance x is greater, the audio controller 170 supplies the audio signal R2 to the front speaker R at a higher rate.

In addition, as the absolute value of the distance x is greater, the audio controller 170 reduces the audio signal L1 supplied to the front speaker L, and also reduces the audio signal R1 supplied to the front speaker R.

For example, the audio controller 170 can supply C1', L1', R1', L2', and R2', which are represented by the following formulae, to the center speaker C, the front speaker L, the front speaker R, the rear speaker Ls, and the rear speaker Rs, respectively.

$$C1'=(1-|x|/D)C1$$

$$L1'=(1-|x|/D)L1+(|x|/D)L2$$

$$R1'=(1-|x|/D)R1+(|x|/D)R2$$

$$L2'=(1-|x|/D)L2$$

$$R2'=(1-|x|/D)R2$$

(When −D=x)

Figure 12:
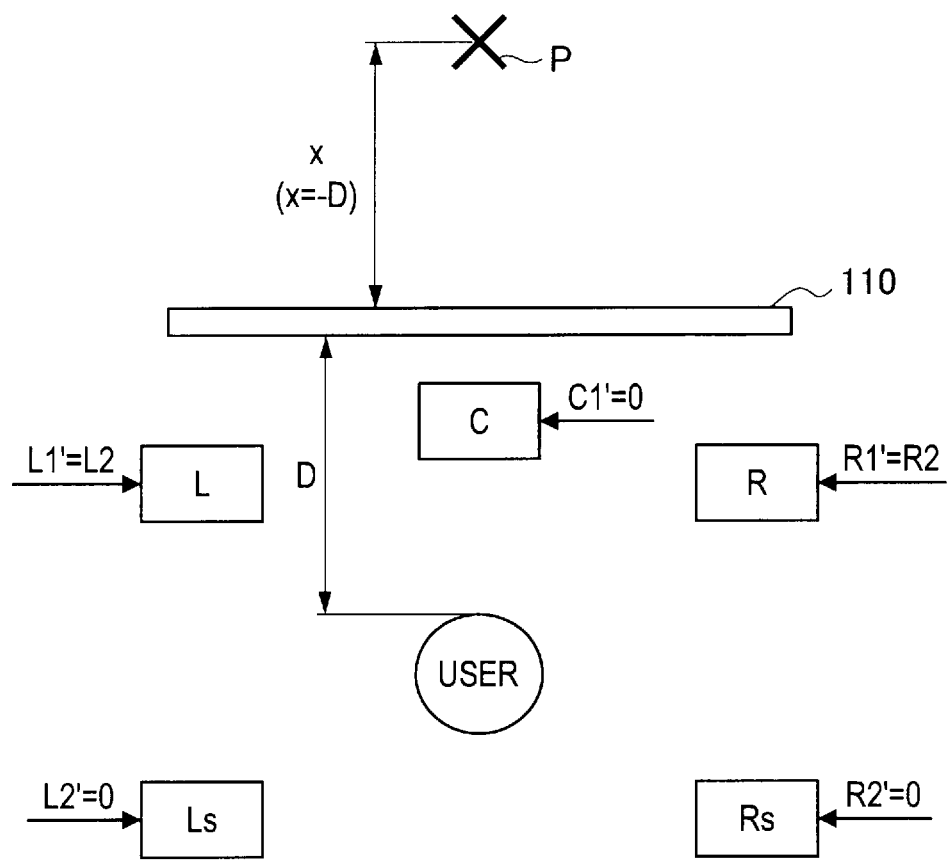
FIG. 12 is an explanatory diagram showing audio control performed by the audio controller when the image display unit is closer to the user than is the user's perceived position P of a stereoscopic image.

When the absolute value of the distance x obtained by the video analysis unit 160 is equal to the viewing distance D of the user as shown in FIG. 12, the audio controller 170 supplies C1', L1', R1', L2', and R2', which are represented by the following formulae, to the corresponding speakers.

$$C1'=0$$

$$L1'=L2$$

$R1'=R2$ $L2'=0$ $R2'=0$ (When x←−D)

Described next is audio control performed when the distance x obtained by the video analysis unit 160 satisfies "x←−D," that is, when the image display unit 110 is closer to the user than is the user's perceived position P of a stereoscopic image, and the absolute value of x is greater than D.

Figure 13:
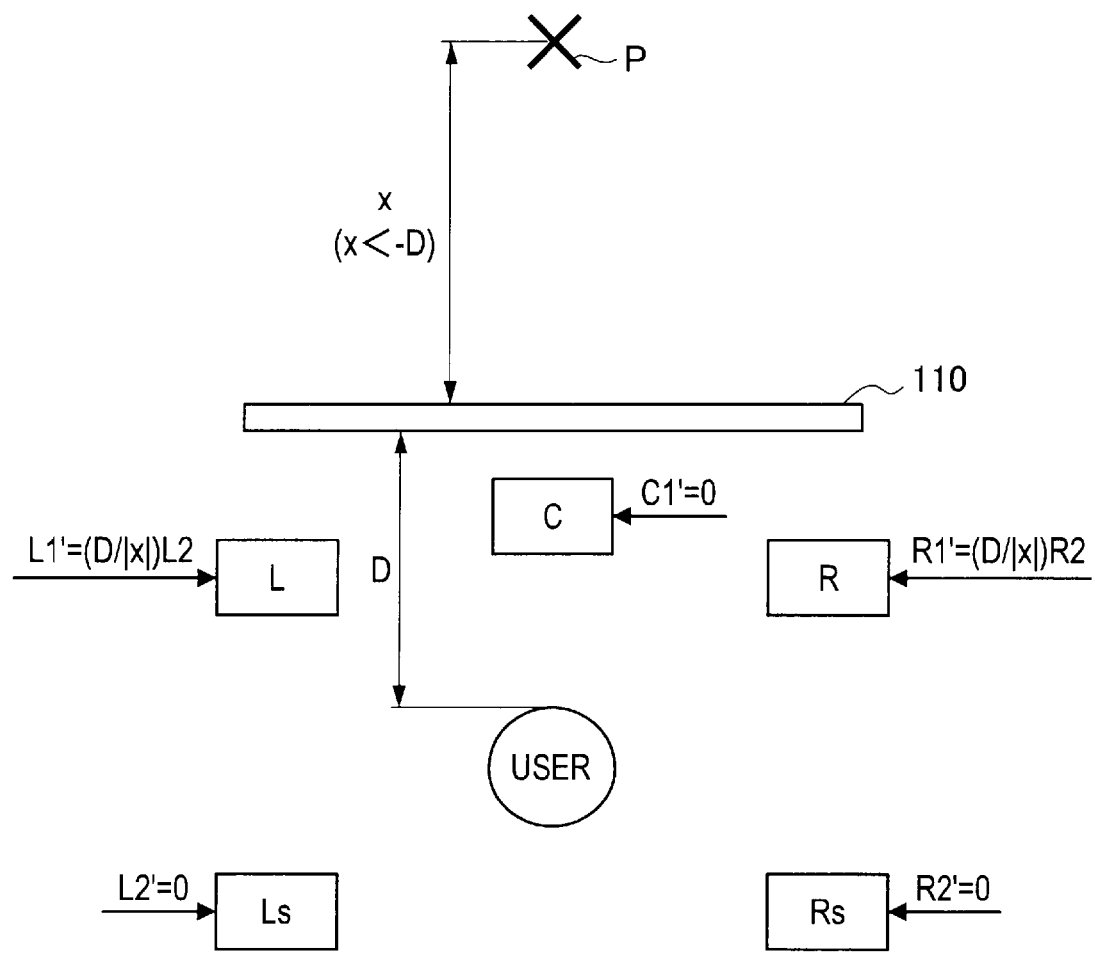
FIG. 13 is an explanatory diagram showing audio control performed by the audio controller when the image display unit is closer to the user than is the user's perceived position P of a stereoscopic image.

FIG. 13 is an explanatory diagram showing audio control performed by the audio controller 170 when the image display unit 110 is closer to the user than is the user's perceived position P of a stereoscopic image. In this case, the audio controller 170 supplies the audio signal L2, which is originally intended for the rear speaker Ls, to the front speaker L with a magnitude in accordance with the distance x. More specifically, as the absolute value of the distance x is greater, the audio controller 170 reduces the audio signal L2 supplied to the front speaker L.

Likewise, the audio controller 170 supplies the audio signal R2, which is originally intended for the rear speaker Rs, to the front speaker R with a magnitude in accordance with the distance x. More specifically, as the absolute value of the distance x is greater, the audio controller 170 reduces the audio signal R2 supplied to the front speaker R.

For example, the audio controller 170 can supply C1', L1', R1', L2', and R2', which are represented by the following formulae, to the center speaker C, the front speaker L, the front speaker R, the rear speaker Ls, and the rear speaker Rs, respectively.

$C1'=0$ $L1'=(D/|x|)R2$ $R1'=(D/|x|)R2$ $L2'=0$ $R2'=0$

As described above, the display device 100 in accordance with an embodiment of the present disclosure can control audio output of each speaker in accordance with the user's representative perceived position of a stereoscopic image that is based on a left-eye image and a right-eye image.

3. Operation of Display Device

Next, the operation of the display device 100 in accordance with an embodiment of the present disclosure will be briefly described with reference to FIG. 14.

Figure 14:
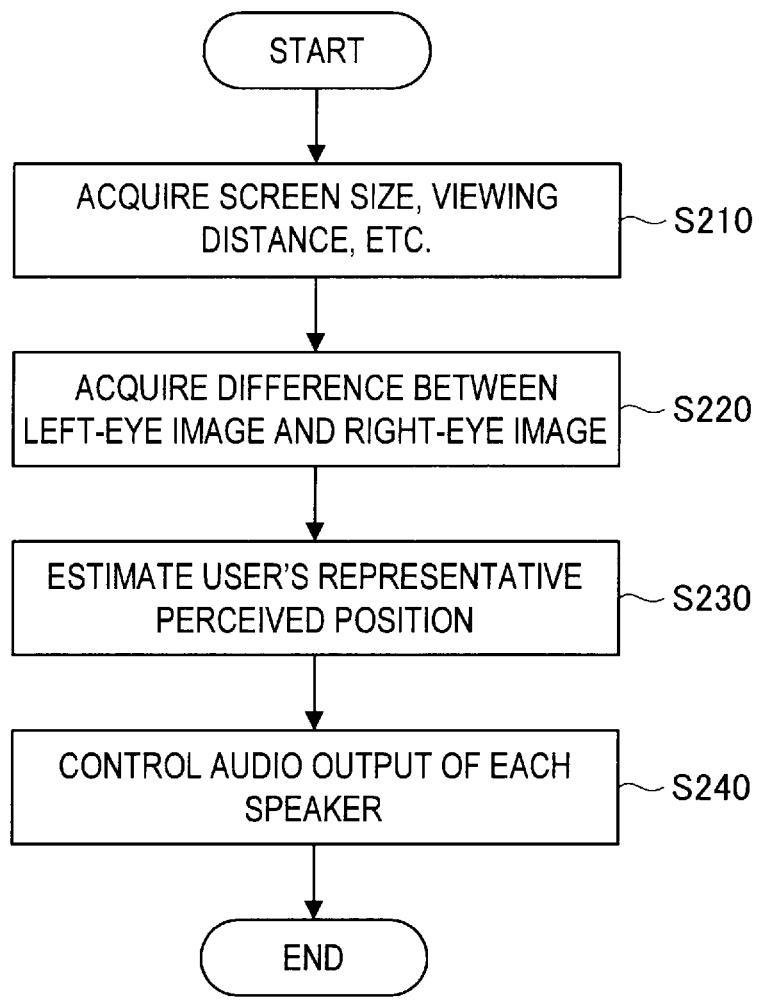
FIG. 14 is a flowchart showing the operation of a display device in accordance with an embodiment of the present disclosure.

FIG. 14 is a flowchart showing the operation of the display device 100 in accordance with an embodiment of the present disclosure. First, as shown in FIG. 14, the video analysis unit 160 of the display device 100 acquires information such as a screen size of the display device 100 and the viewing distance of the user (S210). Then, the video analysis unit 160 acquires the difference between a left-eye image and a right-eye image on the basis of an input 3D video signal (S220).

Then, the video analysis unit 160, on the basis of the information acquired in S210 and the difference between the left-eye image and the right-eye image, estimates the user's representative perceived position of a stereoscopic image (S230). That is, the video analysis unit 160 calculates the distance x between the user's representative perceived position of the stereoscopic image and the image display unit 110.

Note that the distance x can be calculated with a variety of methods as described in the "2-1. Estimation of Representative Perceived Position" section. Thereafter, the audio controller 170 controls audio output of each speaker that constitutes the speaker system 180 in accordance with the distance x calculated by the video analysis unit 160 (S240).

4. Conclusion

As described above, the display device 100 in accordance with the embodiment of the present disclosure can control audio output of each speaker in accordance with the user's representative perceived position of a stereoscopic image that is based on a left-eye image and a right-eye image. Consequently, the linkage between a 3D image, which is composed of a left-eye image and a right-eye image, and an audio signal can be emphasized more.

For example, when content such as Kabuki (a classical Japanese dance-drama) or a drama is to be reproduced, and the user's perceived position of a stage is estimated to be the rear side of the image display unit 110, the display device 100 controls audio signals, which are originally intended for the rear speakers, to be output from the front speakers. According to such a configuration, the user can more strongly feel that he is viewing the whole stage from a far place. In addition, when content such as orchestra performance is to be reproduced and the user's perceived position of the orchestra is estimated to be closer to the user than is the image display unit 110, the display device 100 controls audio signals, which are originally intended for the front speakers, to be output from the rear speakers. According to such a configuration, the user can more strongly feel a sense of realism so that he feels as if he is among the members of the orchestra at the orchestra site.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although the aforementioned embodiments have illustrated an example in which a representative image object in a stereoscopic image is detected using the face detection technology, the present disclosure is not limited to thereto. Other than a face image, an object with a motion is considered to be a representative image object. Thus, the display device 100 can, for example, perform the following process to detect an object with a motion as a representative image object in a stereoscopic image.

(Step 1)

The display device 100, on the basis of each frame, detects a motion of an imaging device of when each frame was imaged. The motion of the imaging device includes a movement of the position of the imaging device, a change in the imaging direction of the imaging device, and the like. The motion of the imaging device can be detected on the basis of, for example, the difference between two consecutive frames. More specifically, the display device 100, for each block that makes up a frame L−1, predicts a motion in a frame L, and thus obtains a motion vector of each block. Then, the display device 100 removes motion vectors, which greatly differ from the dominant direction, from the motion vectors of all the blocks, to thereby detect a motion vector of the imaging device from the remaining motion vectors.

(Step 2)

The display device 100 converts the frame L−1 so that the motion vector of the imaging device detected in Step 1 is canceled. For example, when the direction of the motion vector of the imaging device detected in Step 1 is Q and the size thereof is R, an image within the frame L−1 is moved in the −Q direction by a size of R.

(Step 3)

The display device 100 generates a differential image between the frame L and the frame L−1 after the conversion in Step 2. Herein, the position of even a still object would differ in the frame L and the frame L−1 due to a motion of the imaging device. However, as the motion of the imaging device has been cancelled in the frame L−1 after the conversion as described above, it is considered that the position at which a still object is located is almost the same in the frame L and the frame L−1 after the conversion. Therefore, mainly an object with a motion appears as the difference in the differential image between the frame L and the frame L−1 after the conversion.

(Step 4)

The display device 100 detects an object with a motion from the differential image generated in Step 3. As the display device 100 can detect an object with a motion as a representative image object in a stereoscopic image as described above, it is possible to calculate the user's perceived position of the object with a motion as the user's representative perceived position. According to such a configuration, the display device 100 can detect, for example, a racing car in a stereoscopic image of a circuit as an object with a motion, and perform audio control in accordance with the user's perceived position of the racing car.

Alternatively, the display device 100 can detect an object, which has been imaged by tracking with an imaging device, (an object imaged by chasing) as a representative image object in a stereoscopic image, and perform audio control in accordance with the user's perceived position of the object. Described below is an exemplary method for detecting an object that has been imaged by tracking with an imaging device.

(Step 1)

The display device 100, on the basis of each frame, detects a motion of an imaging device of when each frame was imaged.

(Step 2)

The display device 100 determines a section in which the amount of the motion of the imaging device, which has been detected in Step 1, is above a threshold to be a section in which the imaging device was moving.

(Step 3)

The display device 100 detects an object, which is detected in a section that is longer than a predetermined length, within the section in which the imaging device was moving, to be an object that has been imaged by tracking.

Although the description has been made above of an example in which the volume of an audio signal output of each speaker is controlled as a control of audio output of each speaker, the present disclosure is not limited thereto. For example, the technical scope of the present disclosure includes, instead of the volume control, or in addition to the volume control, controlling the phase of an audio signal output of each speaker.

In addition, the steps of the process performed by the display device 100 in this specification need not be performed chronologically in accordance with the order described in the flowchart. For example, the steps of the process performed by the display device 100 can be either performed in an order that differs from the order described in the flowchart or be performed in parallel. In addition, it is also possible to create a computer program for causing hardware such as a CPU, ROM, or RAM built in the display device 100 to exert a function that is equivalent to the function of each unit of the aforementioned display device 100. Further, there is also provided a storage medium having the computer program stored therein.

What is claimed is:

1. An audio processing device comprising:
    an estimation unit configured to:
        divide a left-eye image and a right-eye image of a stereoscopic image to be displayed on a display device into a plurality of regions;
        estimate a representative perceived position of the stereoscopic image with respect to a user based on one or more perceived positions of each of the plurality of regions and a pixel size of the display device, wherein the one or more perceived positions are calculated based on a difference between the left-eye image and the right-eye image of the stereoscopic image; and
    an audio controller configured to control audio output of an audio output device in accordance with the representative perceived position.

2. The audio processing device according to claim 1, wherein the audio output device comprises a front audio output device and a rear audio output device, the rear audio output device being arranged at a position that is farther from the display device than the front audio output device, and the audio controller controls the audio output of the front audio output device and the rear audio output device in accordance with a distance between the representative perceived position and a reference plane.

3. The audio processing device according to claim 2, wherein, when the representative perceived position coincides with the reference plane, the audio controller supplies a first audio signal to the front audio output device, and supplies a second audio signal to the rear audio output device.

4. The audio processing device according to claim 3, wherein, when the representative perceived position is closer to the user than the reference plane, the audio controller supplies the first audio signal to the front audio output device and the rear audio output device at a ratio in accordance with a distance between the representative perceived position and the reference plane.

5. The audio processing device according to claim 4, wherein the audio controller, supplies the first audio signal to the rear audio output device at a rate corresponding to the distance between the representative perceived position and the reference plane.

6. The audio processing device according to claim 5, wherein the audio controller, reduces the second audio signal supplied to the rear audio output device at a rate corresponding to the distance between the representative perceived position and the reference plane.

7. The audio processing device according to claim 3, wherein, when the reference plane is closer to the user than the representative perceived position, the audio controller supplies the second audio signal to the front audio output device and the rear audio output device at a ratio in accordance with the distance between the representative perceived position and the reference plane.

8. The audio processing device according to claim 7, wherein the audio controller supplies the second audio signal to the front audio output device at a rate corresponding to the distance between the representative perceived position and the reference plane.

9. The audio processing device according to claim 8, wherein the audio controller reduces the first audio signal supplied to the front audio output device at a rate corresponding to the distance between the representative perceived position and the reference plane.

10. The audio processing device according to claim 1, wherein the estimation unit estimates a perceived position of each of a plurality of face images, and estimates the representative perceived position based on the perceived position of each of the plurality of face images.

11. The audio processing device according to claim 10, wherein the estimation unit estimates, as the representative perceived position, one of the perceived positions of the plurality of face images.

12. The audio processing device according to claim 10, wherein the estimation unit estimates, as the representative perceived position, a mean value of the perceived positions of the plurality of face images.

13. The audio processing device according to claim 1, wherein the estimation unit estimates the representative perceived position based on a distribution of the one or more perceived positions of the plurality of regions.

14. The audio processing device according to claim 1, wherein the estimation unit is configured to detect a plurality of face images in the left-eye image and the right-eye image.

15. The audio processing device according to claim 14, wherein the estimation unit estimates a perceived position of each of the plurality of face images, and estimates the representative perceived position based on the perceived position of each of the plurality of face images.

16. The audio processing device according to claim 1, wherein the one or more perceived positions are calculated from the difference in horizontal display positions between an image object included in the left-eye image and an image object included in the right-eye image.

17. The audio processing device according to claim 1, wherein the estimation unit estimates distances between the one or more perceived positions of the plurality of regions and the display device.

18. The audio processing device according to claim 1, wherein the estimation unit calculates a distance based on a distribution of distances estimated for the plurality of regions, and wherein the audio controller controls the audio output of the audio output device based on the calculated distance.

19. An audio processing method comprising:
dividing a left-eye image and a right-eye image of a stereoscopic image to be displayed on a display device into a plurality of regions;
estimating a representative perceived position of the stereoscopic image with respect to a user based on one or more perceived positions of each of the plurality of regions and a pixel size of the display device, wherein the one or more perceived positions are calculated based on a difference between the left-eye image and the right-eye image of the stereoscopic image; and
controlling audio output of an audio output device in accordance with the representative perceived position.

20. A non-transitory computer-readable storage medium having stored thereon, a computer program having at least one code section for communication, the at least one code section being executable by a computer for causing the computer to perform steps comprising:
dividing a left-eye image and a right-eye image of a stereoscopic image to be displayed on a display device into a plurality of regions;
estimating a representative perceived position of the stereoscopic image with respect to a user based on one or more perceived positions of each of the plurality of regions and a pixel size of the display device, wherein the one or more perceived positions are calculated based on a difference between the left-eye image and the right-eye image of the stereoscopic image; and
controlling audio output of an audio output device in accordance with the representative perceived position.

* * * * *